United States Patent

[11] 3,592,492

| [72] | Inventor | Willard H. Lind<br>c/o General Matrix Corporation 257<br>Newtonville Ave., Newton, Mass. 02158 |
|---|---|---|
| [21] | Appl. No. | 788,875 |
| [22] | Filed | Jan. 3, 1969 |
| [45] | Patented | July 13, 1971 |

[54] CONSTRUCTION FASTENER
8 Claims, 11 Drawing Figs.

[52] U.S. Cl. ................................................. 287/189.35,
52/713
[51] Int. Cl. ..................................................... F16b 19/00
[50] Field of Search ........................................... 287/189.35;
52/521, 544, 660, 670, 747, 748, 581, 584, 713;
256/47, 48, 52

[56] References Cited
UNITED STATES PATENTS

| 506,259 | 10/1893 | Riter | 256/52 UX |
|---|---|---|---|
| 963,938 | 7/1910 | Phillips | 256/52 |
| 1,694,043 | 12/1928 | Thomson | 287/189.35 X |
| 2,414,483 | 1/1947 | Okonski | 52/581 X |

*Primary Examiner*—David J. Williamowsky
*Assistant Examiner*—Wayne L. Shedd
*Attorney*—Kenway, Jenney and Hildreth ABSTRACT: A fastener for securing a first sheet of expanded metal having repetitive diamond shaped holes to a second, structural member having an aperture when the aperture is in registry with one of the diamond holes. The fastener includes a clip having a loop which is positioned in the registered holes to receive the midportion of an elongated rod disposed lengthwise of the diamond hole and means engageable with the second, structural member for retaining the loop in position. The ends of the rod bear against lengthwise opposed bridges of the hole and the loop is disposed transversely to the rod so that the rod must be bowed to simultaneously bear against the bridges and pass through the loop. The direction in which the rod is bowed forces the expanded metal sheet and structural member together.

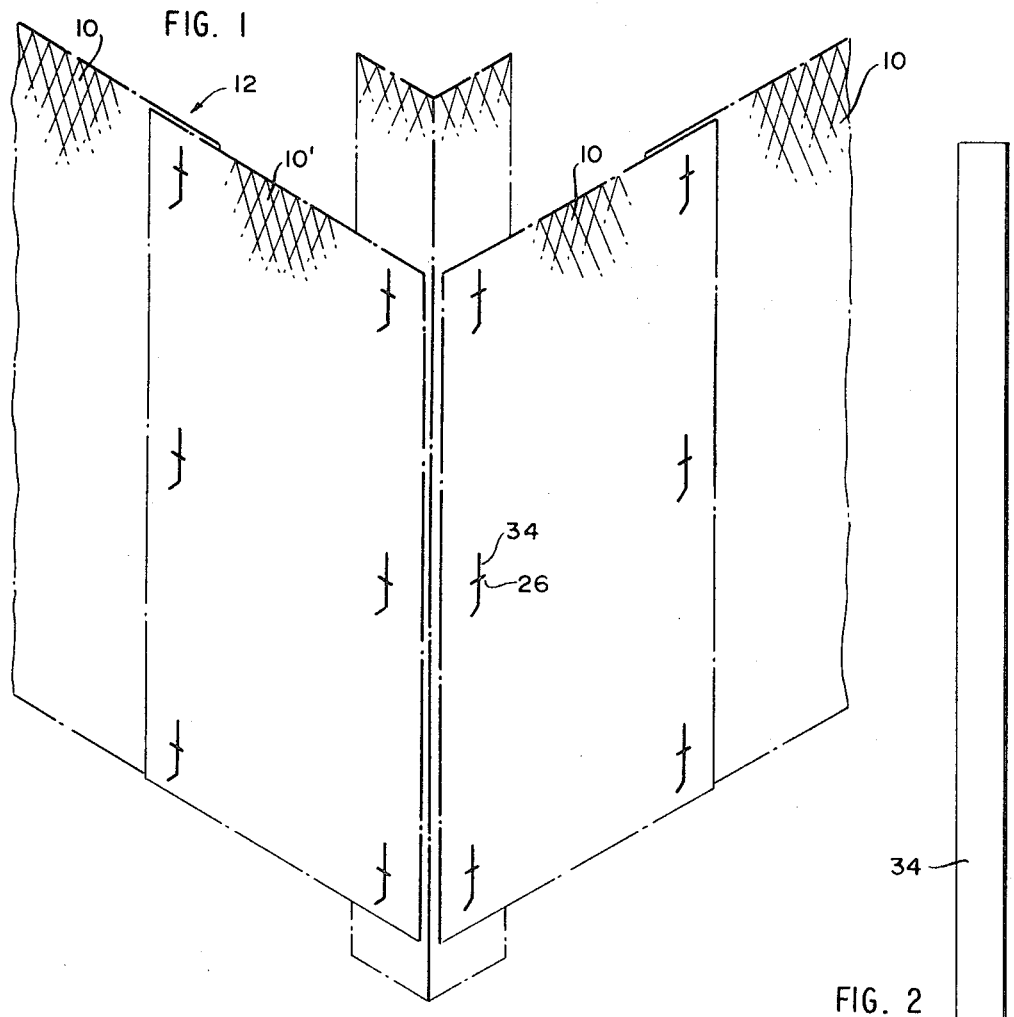
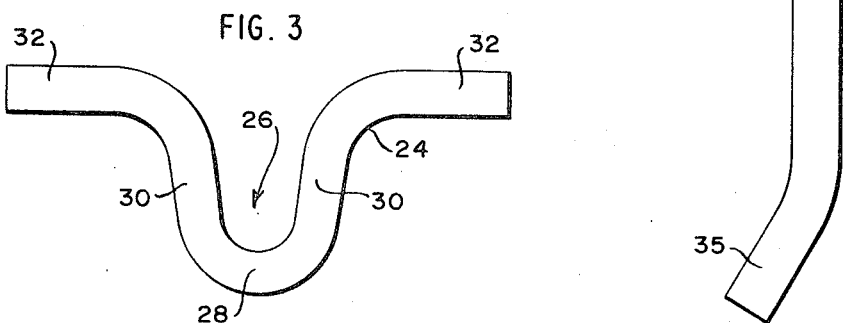
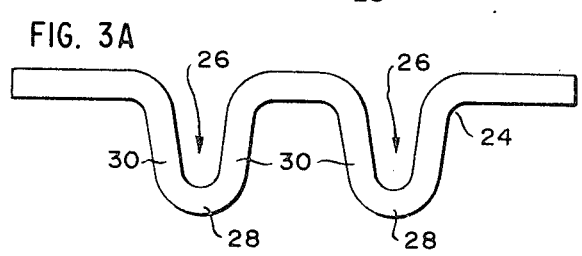
INVENTOR.
WILLARD H. LIND
BY Kenway, Jenney &
Hildreth
ATTORNEYS

PATENTED JUL 13 1971

INVENTOR.
WILLARD H. LIND

BY Kenway, Jenney &
Hildreth

ATTORNEYS

CONSTRUCTION FASTENER

SUMMARY OF THE INVENTION

My invention is directed to a fastener for securing a first sheet of expanded metal to a second, structural member which is provided with an aperture that is registerable with one of the diamond holes in the expanded metal sheet. The fastener includes a clip having a pin-receptive loop which passes through the registered hole and aperture so that the plane of the loop intersects the plane of the diamond hole in the expanded metal mesh. When in its intended position, the plane of the loop is disposed normally to the lengthwise dimension of the diamond hole so that a rod extending lengthwise of the diamond hole may be passed through the loop with the ends of the rod bearing against the bridges which define the lengthwise ends of the diamond hole. The loop is further positioned so that the rod must be bowed in order to simultaneously pass through the loop and bear against the opposed bridges of the hole in the expanded metal sheet. The clip and its looped portion are retained in the proper position by means of a pair of legs formed integrally with the clip that extend in opposite directions and which are engageable with the structural member to preclude the clip from passing freely through the aperture and to retain the clip and loop in the aforementioned position.

When securing the expanded metal sheet to the structural member in accordance with my invention, the clip is initially placed in its proper position and the rod is then driven axially through the loop. This method of assembly requires minimal skill and time and requires only that one end of the rod be tapped lightly with a hammer. Thus, it is among the objects of my invention to provide a fastener for securing a sheet of expanded metal to a structural member without the use of special tools as would be required if they were fastened by welding, riveting, twisted wires, bolts or other, more common, connectors.

Another object of my invention is to provide a fastener which may be connected quickly and without difficult manipulation.

The clip and rod may be formed conveniently from wire or rod stock and require no machining or other additional finishing as would be required, for example, with nuts and bolts. It is thus a further object of my invention to provide a fastener of simple fabrication which lends itself readily to low cost mass production. Another feature of my fastener resides in the fact that it may be disassembled with the same ease with which it was originally assembled. All that is required is that the other end of the rod be tapped a few times. I consider it to be a remarkable feature of my invention that the fastener may be assembled and disassembled with such relative ease and yet provide an extremely strong and rigid connection between assembled expanded metal sheet and structural member.

As will be later described, the second, structural member may itself consist of an expanded metal sheet and may be of an identical mesh to that of the first expanded metal sheet so that they may be nested within each other. I have found that after the nested sheets have been assembled and fastened in accordance with my invention they display characteristics of strength and rigidity substantially equal to those displayed by a single unitary sheet of expanded metal.

The strong connection which my fastener provides permits a complete structure, which would ordinarily be relatively large, bulky and heavy, to be broken down into a number of sections so that they may be individually handled, stored, or moved to the location at which they are to be finally assembled. Thus my fastener is highly suited for me in "modular" construction techniques wherein portions or modules of a completed structure are preassembled for example, in a factory, and are assembled into the final, complete structure at the construction site.

The simplicity required to connect or disconnect my fastener makes it particularly useful in construction methods wherein it is desirable to preassemble the various expanded sheets and structural members to permit the accuracy of the finished structure to be checked at an intermediate stage of construction. Thus, should it be desired to change or rearrange some of the expanded sheets or the structural members, my fastener may be disconnected readily and simply to permit the desired structural modification. Once it is determined that the construction members are in their desired final configuration expanded metal sheets may be permanently secured such as by welding, riveting, etc. Because of the strength displayed by my fastener there may be many instances where no further fastening means would be required. It would be apparent that when used in conjunction with this method of construction my fastener is ideally suited for use as a temporary fastener by reason of the ease with which it may be disconnected.

From the foregoing it will be appreciated that, in addition, my fastener is particularly useful in the construction of relatively mobile or emergency structures such as temporary bridges, housing, or the like as well as more permanent structures.

My invention will now be described in greater detail with reference to the accompanying drawings wherein:

FIG. 1 is an exemplary illustration of a structure formed from a number of sheets of expanded metal mesh connected to each other with my fastener in accordance with the invention;

FIG. 2 is a view of the rod portion of my fastener;

FIG. 3 is a view of the clip portion of my fastener;

FIG. 3a is an illustration of a modified clip having a plurality of loops;

Figure 10:
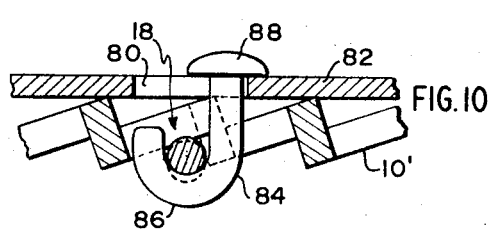
FIG. 10 is an illustration of an alternative form of my fastener.

Although FIG. 1 shows a structure formed of expanded metal sheets alone, my fastener may be used to secure an expanded metal sheet to other structural members such as for example, solid metal plates, structural beams and the like as shown in FIG. 10. The edges of adjacent sheets are overlapped as shown at 12 in FIG. 1 and are nested within each other so that my fastener may then rigidly connect the sheets.

At the outset it should be noted that expanded metal is produced by piercing solid sheet or plate in rows of parallel slits. The slits are then expanded to their characteristic diamond opening. It is common practice in the production of expanded metal to provide a tool that simultaneously forms the slit and then acts as a forming die to expand the slit into the enlarged opening.

Figure 4:
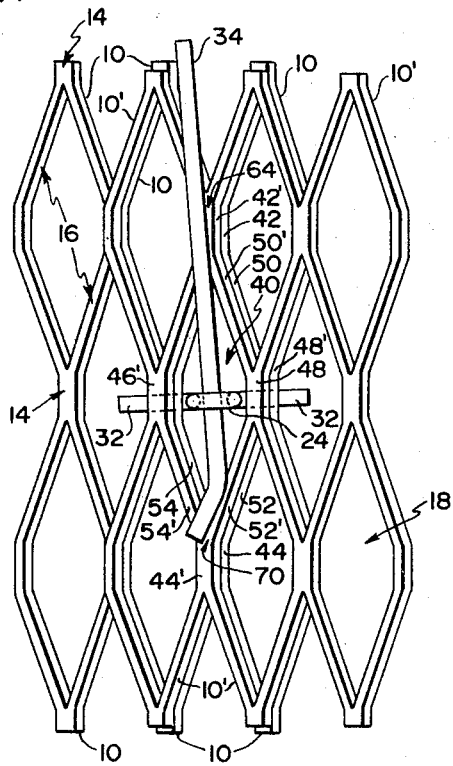
FIG. 4 is an illustration of my fastener as applied to the overlapped nested edges of a pair of expanded metal sheets before the rod is urged to its bowed, fastened position.
Figure 5:
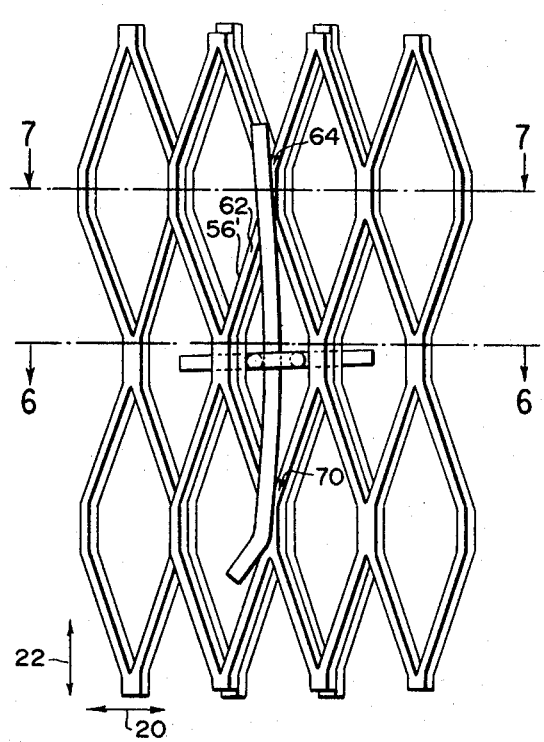
FIG. 5 is a view similar to FIG. 4 showing the rod in its connected and fastened position and further illustrating manner in which the rod is bowed.
Figure 6:
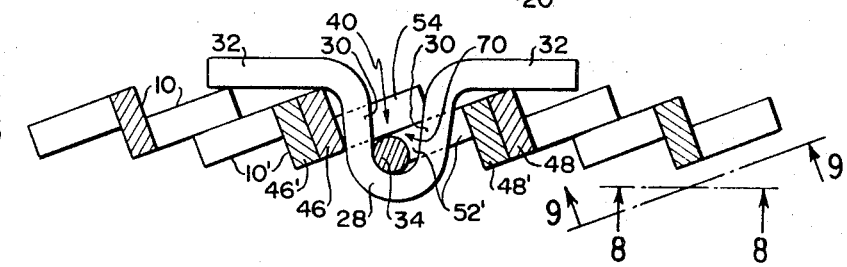
FIG. 6 is an illustration in section of the overlapped nested metal sheets and my fastener as viewed along the line 6–6 of FIG. 5.

As shown more clearly in FIGS. 4, 5 and 6, the expanded metal sheet is defined by a plurality of bridges referred to generally by the character 14, interconnected by strands 16 which define cooperatively a mesh having a plurality of repetitive holes 18, each of the holes 18 being surrounded and defined by four bridges 14 and four interconnecting strands 16.

The most common mesh pattern defines repetitive diamond-shaped holes 18. Other configurations, however, are also employed which vary from the true diamond pattern. It will be noted, however, that whatever the shape of the hole 18 in the expanded metal mesh, each hole is defined by a plurality of surrounding and interconnected bridges 14 and strands 16. For ease of explanation, the holes formed and defined by the expanded metal mesh will be referred to as "diamond holes" whether or not they are of the true, conventional diamond shape.

For ease of explanation the sheet of expanded metal which is engaged by the pin of my fastener will be referred to as the first sheet and will be designated by the reference character 10'. The other, structural member, whether a sheet of expanded metal or not and which is engaged by the clip (as will be later described) will hereinafter be referred to as the "structural member" or "second sheet" and will be designated by the reference character 10. Similarly when the second sheet consists of expanded metal the various portions of the first sheet 10' will be designated by the same reference character corresponding to an identical portion of the second sheet 10 with the addition of a prime mark ('). Additionally the term "width" will refer to directions along the direction of expansion indicated by the arrow 20 and the term "length" will refer to direction indicated by the arrows 22 in FIG. 5.

As shown in FIG. 3 one embodiment of my invention includes a clip 24 which conveniently may be fabricated from wire or rod stock. The midportion of the clip 24 is formed to define a substantially U-shaped loop 26 having a bight portion 28 and a pair of spaced arms 30 extending from the bight 28. The ends of the clip 24 terminate in legs 32 which extend in substantially opposite directions from the arms 30. The clip 24 cooperates with the abutting sheets 10, 10' and the rod 34 shown in FIG. 2 to secure the sheets 10, 10' in the manner described below.

The manner in which my fastener is used will be described initially as fastening a pair of unflattened expanded metal sheets having an identical mesh and which are disposed in a nested configuration. The fastener will be described with respect to the arbitrarily chosen hole 40 and its surrounding strands and bridges, the hole 40 being defined by registration of a diamond hole in the first expanded metal sheet 10' and the corresponding aperture formed in the second sheet 10.

As shown in FIGS. 4, 5 and 6, when the first and second sheets 10', 10 are in a nested configuration, the hole 40 is defined by the lengthwise opposed bridges 42 and 44 of the second sheet 10 and the nested corresponding bridges 42', 34' of the first sheet 10'. The widthwise dimension of the hole 40 is defined by the bridges 46, 48 and corresponding bridges 46', 48' of the first and second sheets 10', 10 respectively. The bridges 42, 44, 46 and 48 of the second sheet 10 (the structural member) are interconnected by the strands 40, 52, 54 and 56. Corresponding strands 50', 52', 54' and 56' interconnect the bridges of the first sheet 10'.

Figure 7:
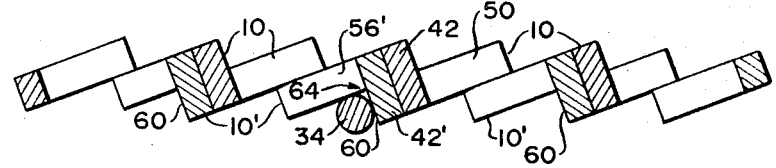
FIG. 7 is a sectional view taken along the line 7–7 of FIG. 5 and illustrates the manner in which the ends of the rod bear against the corners found at the bridges.
Figure 8:
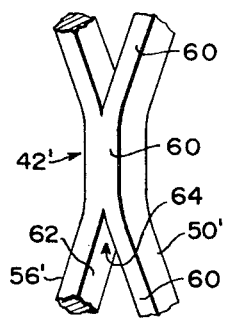
FIG. 8 is a plan view of one of the bridges of the expanded metal sheet view along the line 8–8 of FIG. 6 and illustrating the corners of the bridge.
Figure 9:
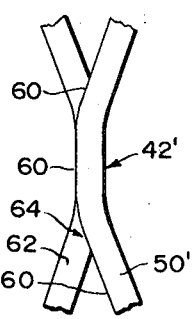
FIG. 9 is an illustration similar to that of FIG. 8 but from a different angle as viewed from the line 9–9 of FIG. 6.

In order to more clearly understand my invention it may be seen from FIGS. 7, 8 and 9 that the bridge 42' as well as the other bridges that make up the expanded metal mesh have a somewhat convex surface 60. The strand 56' which radiates from the bridge 42 has a surface 62 which defines a plane substantially normal to the convex surface 60. It may be appreciated that the surface 62 is formed as a result of the expansion of the steel plate when the mesh is initially formed. Thus, a corner region 64 is formed by the surfaces 60, 62. The bridge 44' is of identical construction, having a convex surface 66, and inner strand surface 68 formed on the strand 54' which cooperate to define the corner 70. It may be appreciated further that each of the bridges and its associated strands will define corners identical to those indicated by the reference characters 64 and 70. For the purpose of understanding my invention, however, it is only necessary to refer to the corners 64 and 70 at the lengthwise opposed ends of the diamond hole.

In accordance with my invention the ends of the rod 34 are intended to be located within the corners 64, 70 respectively of the pinned sheet 10' so that the midportion of the rod 34 is disposed lengthwise of the diamond hole 40. It will be appreciated from FIG. 5 that were the rod to be nested into the corners 64 and 70 in an unbowed condition to span the hole 40, the axis of the rod would be displaced with somewhat widthwise of the hole 40 and be closer to the bridge 46' than to the bridge 48'. This condition is accentuated further when the expanded sheet 10' is nested with the sheet 10 in that when the sheets are nested, the rod 34 is disposed even closer to the bridge 46 of the sheet 10.

In use, the clip 24 is placed initially in the position shown in FIGS. 4, 5 and 6 with the legs 32 of the clip 24 bearing against the opposed bridges 46, 48 of the second sheet 10 (the "structural member"). The arms 30 and bight 28 of the clip 24 protrude into the hole 40 normally to the plane of the sheets so that the plane of the loop 26 is disposed substantially normal to the axis of the rod 34 thus enabling the rod 34 to be passed through the loop 26. Because of the widthwise displacement of the unbowed rod 34 it will be appreciated that in order for the ends of the rod 34 to bear simultaneously against the corners 64 and 70 and yet pass through the loop 26 of the clip 24, the midportion of the rod 34 must be bent or bowed widthwise toward the bridges 48, 48' as shown in FIG. 5. The rod is formed from a resilient material, such as steel, so that the stresses in the bowed rod shown in FIG. 5 may act on the clip and sheets 10 and 10' to lock the sheets together. It should be noted that the clip 24 is fabricated so that the width of the loop 26, as defined by the arms 30, is only slightly less than the width of the hole 40 defined by the registered diamond hole and aperture of the first and second sheets 10' and 10 respectively so that when the loop 26 is properly positioned it will be restrained from substantial widthwise movement within the hole. Thus when the rod 34 is bowed as shown in FIG. 5, the clip will be forced slightly widthwise to the left as seen in FIGS. 4, 5 and 6 until the arm 30 of the clip 24 adjacent the bridges 46, 46' bears against the bridge 46. The dimension of the clip 24 therefore must be such that when the arm of the clip 24 bears against the bridge 46 the loop 26 will still be positioned transversely of the rod 34 to require that the rod 34 be bowed to engage the corners 64, 70 while passing through the loop 26.

In assembling the sheets the clip 24 is positioned as described above and one end of the rod 34 is passed through the loop 26, the other end of the rod being disposed in the corner 64. As illustrated in FIG. 4, because of the transverse displacement of the loop 26, the end of the rod 34 that was initially passed through the loop 26 will be unable to engage the corner 70 of the bridge 44' and will engage the strand 52' as long as the rod remains unbowed. It will be noted that that end of the rod 34 engages the strand 52' at a relatively sharp wedgelike angle, from which it will be appreciated that when the other end of the rod is tapped axially, as with a hammer, the rod will be forced lengthwise through the loop 26 with the leading end riding along the strand 52' into engagement with the convex surface of the bridge 44' and into the corner 70. The rod 34' thus becomes resiliently bowed when urged to this configuration and secures firmly the sheets 10, 10'. The angle at which the leading end of the rod 34 engages the strand 52' may be further reduced by fabricating the rod 34 with a bent portion 35 at its leading end. This permits the rod 34 to engage the strand 52' more smoothly thus reducing the force required to drive the pin axially to its bowed configuration.

My fastener has been described thus far in securing the first expanded metal sheet 10' to the second structural member 10 which is itself an expanded metal sheet of identical mesh, nestable with the first sheet. As mentioned earlier, a fastener may be provided in accordance with my invention to secure the first expanded metal sheet to other structural members such as solid plates, or structural beams. As illustrated in FIG. 10, an aperture 80 is provided in the second, structural member 82 and is dimensioned to receive the clip 84 so that the looped portion 86 may extend through the aperture and into the registered diamond hole 18 of the first expanded metal sheet. The slip 84 is dimensioned and shaped so that the looped portion 86 will be located in the proper position within and with respect to the diamond-shaped hole 18. Any number of configurations and shapes for the clip will be readily apparent to those skilled in the art so that a portion thereof is engageable with the structural member to preclude the clip and loop from passing through the registered aperture and diamond hole beyond the desired position of the loop. For example, as illustrated in FIG. 10, the clip 84 may be formed with an enlarged head portion 88 of greater dimensions than the aperture. From the foregoing it will be appreciated that my invention may be practiced with any number of clips varying shapes and configuration. In some structures it may be advantageous to use a clip with the loop formed at its midportion as shown in FIG. 3. In other structures it may be desirable to use a clip as illustrated in FIG. 10. The clip itself and its loop portion 86 must, of course, be of suitable dimensions with respect to the size and shape of the diamond hole in the expanded metal mesh so as to require the requisite bowing of the rod.

It will be appreciated by those skilled in the art that the clip and its looped portion must be dimensioned to require bowing of the rod 34 in a direction which will secure the first expanded metal sheet to the second structural member. It will be further appreciated that although, in the foregoing illustration the clip has been described as being dimensioned to cause the rod to bow in a widthwise direction that is substantially parallel to the plane of the expanded metal sheet, clips may be substituted which will cause the rod to be bowed in other directions tending to urge the ends of the rod 34 into the corners of the lengthwise opposed bridges. Accordingly in the foregoing description and in the appended claims the term "transversely" is intended to mean any direction normal to the axis of the rod 34 which would urge the rod 34 into the corners of lengthwise opposed bridges.

The illustrative embodiments of my invention, as described thus far, are related to a single fastener. My invention may be modified to include a multiple fastener such as that shown in FIG. 3A, having a plurality of loops 26, spaced along the clip at intervals corresponding to the intervals between the diamond holes in the sheets of metal which are to be secured. When this multiple clip is employed, it will be appreciated that after the loops of the clip have been positioned in their respective diamond holes, the clip will be retained in place after one of the rods 34 has been driven through one of the loops 26. The other loops may then be fastened by similar rods in the same manner.

It will be understood that the foregoing description is intended merely to be illustrative of my invention, modifications of which will be apparent to those skilled in the art without departing from its spirit.

Having thus described my invention, I claim:

1. A structural joint between sheets of expanded metal mesh disposed in overlapping, nested relation with diamond apertures in registration, and means securing said sheets in said disposition by a clip having a loop member extending through registering apertures, said clip having means engaging one of said nested sheets to preclude said clip from passing fully through said apertures, and a rod extending through said loop in resilient engagement therewith and with the other sheet of mesh, said rod spanning said apertures.

2. A structural joint between a structural member having an aperture formed therein and a sheet of metal mesh, said structural member and sheet of mesh being disposed in overlapping relation with said aperture in substantial registry with a diamond hole in said mesh, and means securing said parts in said configuration comprising a clip having a loop member extending through said registered aperture and diamond hole, said clip having divergent leg means for engaging said structural member rearwardly thereof to preclude said clip from passing therethrough and a rod extending through said loop in resilient engagement therewith and with said sheet of mesh, said rod spanning said diamond hole.

3. A structural joint as claimed in claim 2 wherein the clip comprises a rod of substantially U-shaped configuration having a bight, a pair of arms extending from said bight and divergent legs extending from said arms in opposite directions beyond the edges of the aperture in the structural member.

4. A structural joint as claimed in claim 3 wherein the structural member has a plurality of spaced apertures in register with holes in the expanded metal, the clip has a plurality of spaced loops extending through registering apertures and holes, and a plurality of rods extend through the loops in the clip in resilient locking engagement with the loops and the expanded metal.

5. A device for securing a first sheet of expanded metal mesh having a plurality of diamond-shaped apertures to a second sheet of expanded metal mesh having apertures similar in shape and size to those of the first sheet, comprising:

a rod of greater length than the long dimension of a diamond hole in said first expanded metal sheet, the ends of said rod being adapted to bear against the corners defined by the lengthwise opposed bridges defining said diamond aperture so that the midportion of said rod may span the length of said aperture;

and a clip having a looped portion adapted to pass through said aperture in said first sheet and through a registering diamond aperture in said second sheet;

said clip having divergent leg means engageable with widthwise opposed bridges of said diamond aperture of said second sheet of mesh rearwardly thereof to preclude said clip from passing through said aperture and to cause said looped portion of said clip to project forwardly of the first sheet and transversely of the axis of said rod when said clip is in said engagement with said second sheet, with the rod extending through the loop in resilient bowed condition in engagement with said corners of the lengthwise opposed bridges of the first sheet of expanded metal mesh.

6. A device as defined in claim 5, wherein the clip of said device has a plurality of looped portions, said looped portions being spaced at intervals along said clip corresponding to the intervals between the apertures in the sheets of expanded metal mesh, thereby to enable said plurality of looped portions simultaneously to pass through said registering apertures, and a plurality of said rods, each of said rods extending through one of said loop portions of the clip and bearing against corners of opposed bridges of the aperture through which said loop extends.

7. A structural joint between sheets of expanded metal mesh having diamond-shaped apertures of similar size and shape, said sheets being disposed in overlapping relation with apertures of said sheets in substantial registry, and means securing said sheets in said registered overlapping relation comprising a clip having a loop portion extending through a pair of registering apertures of said sheets, the clip having divergent leg means engaging one of said sheets rearwardly thereof at widthwise opposed bridges of said sheet of mesh to preclude said clip from passing therethrough, and a rod disposed within the loop of the clip and spanning the diamond-shaped aperture in said other sheet of mesh, said rod extending in resilient bowed relation into engagement with the corners of lengthwise opposed bridges of said other sheet of mesh.

8. A fastener as claimed in claim 7 wherein one end of said rod is bent at an angle to the remaining portion of said rod to facilitate engagement of said end of said rod with the corner portion of its associated bridge.